(12) United States Patent
Hedman

(10) Patent No.: US 7,047,910 B2
(45) Date of Patent: May 23, 2006

(54) METHOD OF TORQUE MODULATION

(75) Inventor: Mats Hedman, Båvensvik (SE)

(73) Assignee: Cargine Engineering AB, Helsingborg (SE)

(*) Notice: Subject to any disclaimer, the term of this patent is extended or adjusted under 35 U.S.C. 154(b) by 0 days.

(21) Appl. No.: 10/488,878

(22) PCT Filed: Aug. 29, 2002

(86) PCT No.: PCT/SE02/01536

§ 371 (c)(1),
(2), (4) Date: Jul. 7, 2004

(87) PCT Pub. No.: WO03/023209

PCT Pub. Date: Mar. 20, 2003

(65) Prior Publication Data

US 2004/0244733 A1 Dec. 9, 2004

(30) Foreign Application Priority Data

Sep. 7, 2001 (SE) .................................. 0102990

(51) Int. Cl.
*F02B 69/06* (2006.01)
(52) U.S. Cl. ...................................................... 123/21

(58) Field of Classification Search .................. 123/21, 123/55.4, 55.6, 345, 347, 198 F
See application file for complete search history.

(56) References Cited

U.S. PATENT DOCUMENTS

| 4,489,695 A | 12/1984 | Kohama et al. |
| 4,509,488 A | 4/1985 | Forster et al. |
| 4,541,387 A | 9/1985 | Morikawa |
| 5,377,631 A | 1/1995 | Schechter |
| 6,523,504 B1 * | 2/2003 | Miura ........................ 123/21 |

* cited by examiner

*Primary Examiner*—Andrew M. Dolinar
*Assistant Examiner*—Katrina Harris
(74) *Attorney, Agent, or Firm*—Young & Thompson

(57) ABSTRACT

A control method for modulating the torque in an internal combustion engine with mechanical power transmission and with pneumatically, hydraulically or electromagnetically controllable valves that are open and closed based on signals from a control system, by which method a torque that is requested in an operative situation at a certain moment is provided by a selection of the frequency with which power strokes are performed by controlling the number of power strokes in relation to the number of idle strokes. The power strokes take part in 2-stroke cycles or 4-stroke cycles, and one or more 2-stroke cycles are alternated with or more 4-stroke cycles.

9 Claims, 1 Drawing Sheet

METHOD OF TORQUE MODULATION

TECHNICAL FIELD

The present invention relates to a control method for modulating the torque in an internal combustion engine with mechanical power transmission and with controllable valves. The control method meets, in a new way, a varying need of torque, in a way that reduces the fuel consumption and the environment affection in relation to previously known methods.

The invention is applicable to internal combustion engines with varying load, for example Otto, Diesel or Wankel engines that are used for driving vehicles, aeroplanes, boats, ships etc. In order to make it possible to take advantage of the invention, the engines must be equipped with controllable valves.

The invention can only be reduced to practice through the use of an electronically based control system. The software in the control system determines the function thereof. The software that is used for implementing the invention may, for example, be applied as a part of a larger control system that may also bring completely other properties to the engine in question.

BACKGROUND OF THE INVENTION

During recent years, it has been possible to develop internal combustion engines towards an improved operation economy and a reduced environment affection by the introduction of digital control systems for optimization in different operative situations. For example, this is the case for fuel injection, ignition, variable compression and controllable valves.

During the powering of vehicles it is a problem that, in spite of said improvements during the recent years, the varying operative situations result in the average efficiency of the engines becoming low and the effect on the environment becoming large. There is a further problem as the varying operative situations also result in a varying composition of different poisons and pollutions of the exhaust gases, thereby making the filtering of exhaust gases difficult.

One example of a vehicle engine that is environment friendly is the hybrid engine that mainly operates at a constant number of revolutions per minute that is adapted to a predetermined generator. This engine operates as best when it performs the requested operation at the highest possible efficiency. As the load is constant, also the combustion can be set in order to, in combination with different techniques, result in the lowest possible content of pollutions and poisons in the exhaust gases, such as for example nitrogen oxides and hydrogen carbons, and, in certain cases, soot particles.

If internal combustion engines could meet a varying need of torque, which is the result of different operative situations, with the highest possible efficiency, from the lowest need to the uppermost need, important advantages as to operation economy and environment would be achieved. Such an engine would have the advantages of the hybrid engine in the different operative situations that may come in question for a vehicle. The free-piston engine, based on the idea of performing optimal power strokes upon need thereof, and only then, would be a solution to the above-mentioned problem. However, the free-piston engine in which the moment of the piston is controlled by means of hydraulics or pneumatics, has not become widely spread since there has not been developed a sufficiently good solution for controlling the piston during the compression stroke with subsequent combustion. Strongly accelerating increase of pressure at the end of the compression stroke, and an added, explosive increase of pressure during combustion, results in problems with controlling the movement of the piston at its upper dead point.

The present invention implements, to a high degree, the advantages of the free-piston engine, and solves the above mentioned problems.

THE OBJECT OF THE INVENTION

The object of the present invention is to present a new control method concerning the modulation of the torque in internal combustion engines with mechanical power transmission and with controllable valves, in order to solve set problems and provide said advantages.

SUMMARY OF THE INVENTION

The object of the present invention is achieved by means of a control method for modulating the torque in an internal combustion engine with mechanical power transmission and with controllable valves, characterized in that a torque that is requested at a certain moment of operation, is provided by the selection of the frequency with which power strokes are performed. Further features are disclosed in the following description and in the patent claims.

Mechanical power transmission is referred to as that the energy in a mass of gas that expands after combustion is transmitted to a crankshaft or any other rotating shaft.

Controllable valves are referred to as valves of the combustion chamber of an engine, said valves being able to be opened and closed based on a signal from a control system.

Power stroke is referred to as a stroke in which the energy of a mass of gas that is expanding after combustion is transformed to mechanical work. The power strokes may be optimal or normal, as in today's engines.

Here, idle stroke is referred to as a stroke in which there is no gas exchange, and no supply of air or combustion, and in which, thereby, there is no positive work being performed during what would otherwise have been a power stroke. This results in a minimum of friction and heat losses. During an idle stroke, no air, or air and remaining fuel is pumped through the engine. An idle stroke requires that at least the inlet valves are controllable, in order to be kept closed for the purpose of preventing air from being introduced until they are opened; however the invention is as most advantageous if also the outlet valves are controllable.

The power stroke frequency may vary between 0 and 100 percent of the relevant number of revolutions per minute of the engine. A frequency can be selected by determining that a power stroke shall be performed every n revolution, the remaining strokes being idle strokes, or, for example, by determining that power strokes are to occur according to a series in which an idle stroke is introduced each n revolution. During vehicle operation, it is the driver that, by means of gassing, indicates the need of and request of torque. The gas application is registered by a sensor that makes the control system choose the frequency with which the power strokes are performed.

Here, an optimal power stroke is referred to as that the work that is performed during the power stroke, with regard to the relevant economical and environmental and further practical conditions, is as large as possible in relation to the amount of fuel that is consumed for the work. By meeting the demand of torque at every moment by means of a frequency of optimum power strokes, the best possible operation economy is achieved.

At a 4-stroke cycle operation, the optimum power stroke results in the possibility of closing the inlet valves early in relation to what is common in contemporary engines, and that the outlet valves can be opened late in relation to what is common. Accordingly, the cycles according to Miller and Atkinson respectively becomes naturally present. By means of engine experiments, it is possible to test which settings the contributing parameters and the control values should have at each number of revolutions per minute of the engine. Alternatively, the control system may be adaptive, i.e. self-taughting.

An optimal power stroke during 2-stroke cycle operation differs from an optimal power stroke during 4-stroke cycle operation in that the cylinder pressure that exists when the outlet valves open is to be taken advantage of for the purpose of performing an exchange of gas. Rapidly opening outlet valves results in a pulse of out-flowing exhaust gases that create under pressure, an absolute pressure below 1 atmosphere, in the cylinder. The outlet valves are closed, and the inlet valves are opened in such a time-relationship to the closure of the outlet valves that the under pressure can be taken advantage of in an optimum way in order to provide the correct mass of air before the following compression stroke and subsequent power stroke. Optimal power strokes can also be performed by the use of outlet ports that are released in connection to the lower dead point of the piston.

During the 2-stroke cycle operation, a scavenging pump can be used in order to fully, or partly and then in combination with an under pressure in the cylinder, execute the gas exchange. However, the use of a scavenging pump results in a lower efficiency than what is obtained with the above mentioned, optimal power stroke.

At certain operation conditions it might be necessary to abandon the use of optimal power strokes, for example when maximum effect is needed or if there are enforcing demands.

An engine, and the control system thereof, can be construed for more than one optimum power stroke frequency at a predetermined rotation speed of the engine, by enabling the use of two or more types of fuel that, due to their properties, result in the existence of a plurality of optimum power stroke frequencies. Fuels like petrol and ethanol are one example of such a combination. At each rotation speed there is one optimum power stroke for petrol and another optimum power stroke for ethanol.

According to the invention, the systems for supply of air and fuel are set in such a way that, at each power stroke, at a predetermined number of revolutions per minute of the engine, the same masses of air and fuel and the same mixture of air and fuel shall be ignited as in the other power strokes within the relevant number of revolutions per minute of the engine. Further, any possible EGR is the same for different power strokes. As the preconditions for the combustion are repeated and all the time the same, the result is that each power stroke, at a predetermined rotation speed, will develop the same amount of work as the others, and that the composition of the chemical compounds of the exhaust gases remain the same, thereby improving the possibilities for exhaust gas filtering.

In common 4-stroke cycle internal combustion engines the combustion, during work of the engine, takes place every second revolution, and in 2-stroke cycle engines every revolution. The systems for gas exchange of these engines are unsuitable since the result thereof is that air and the remaining fuel, for example non-combusted hydrocarbons, are pumped through the engine, which requires counter work and puts a load on the environment. In order to be able to use the invention, with the advantages that can be achieved, valves or ports for gas exchange must be possible to close when one or more power strokes are not to be performed, but when, instead, one or more idle strokes are to be performed, which is an often upcoming situation at partial loads. Accordingly, the invention prerequisites controllable valves, at least controllable inlet valves.

With controllable valves, where the time of opening and closure of the valves is controlled by a digital control system, with sensors for, among others, piston positions and number of revolutions per minute, and with electronics and software belonging thereto, gas exchange and power strokes can be performed only when needed. The remaining time the valves, at least the inlet valves, are kept close. This means that, for each requested torque, within the range of performance of the engine at optimum power strokes, the frequency of optimum power strokes that meets the relevant need of torque can be selected.

The control method implies that a digital control system senses a certain and momentary need of torque. If this need is within the range that can be provided by provision of optimum power strokes, a certain frequency, the one that is assumed to meet the need in question, is selected by the control system. At a certain number of revolutions per minute, the power strokes generally result in the same amount of work each time that they are performed. Thereby, it is the frequency of power strokes that is decisive for the size of the torque.

By means of controllable valves, the supply of air and fuel, and the removal of exhaust gases, gas exchange, can take place immediately before and after the power strokes. In order to be able to select a frequency that results in one power stroke being executed each revolution, also gas exchange has to take place each revolution, as in a 2-stroke cycle engine. Gas exchange may also take place as in today's 4-stroke cycle engines, i.e. a suction stroke is introduced, with the result that a power stroke only can be performed each second revolution. Accordingly, the invention implies that a need of a certain torque can be met through a selection of a frequency of 2-stroke cycles or 4-stroke cycles or a frequency in which one or more 2-stroke cycles are mixed with one or more 4-stroke cycles. The invention implies that different frequencies of power strokes can be selected for different engine cylinders. If the inlet valves, but not the outlet valves, are controllable it is only possible to perform 4-stroke cycles.

The control system is provided in order to, as an answer to a torque request, concerning increase or decrease of the torque, from a driver, for example via the gas pedal in a conventional way or in any other way, control the relation between the number of power strokes in relation to the number of idle strokes of the engine based on the requested torque. The control is not performed by bringing individual cylinders of the engine out of function, but by a variation of the relation between the number of power strokes and the number of idle strokes for each cylinder, and by having different relations for different cylinders. The control system provides for this by the opening and closure of inlet valves and outlet valves to the combustion chamber of the respective cylinders, or by the opening and closure of at least the inlet valves, should the outlet valves not be controllable. The opening and closure of at least the inlet valves and in the relevant cases also the outlet valves, is thus performed based on the torque requested by the driver. The activation takes place by means of control signals from a control unit of the control system. At least the inlet valves, but in the relevant cases also the outlet valves, are, for example, pneumatically, hydraulically, electromagnetically or in any other way activated valves. Controllable valves are referred to as such activated valves. If the outlet valves are not controllable, the power strokes will always take part in 4-stroke cycles. If, however both the inlet and the outlet valves are controllable valves, the control system may be arranged in order to, at given conditions, change between 4-stroke cycles and 2-stroke cycles for the cylinders of the engine. For example, one cylinder may operate with 2-stroke cycle and another one with 4-stroke cycle. A maximum torque is obtained if each cylinder operates with 2-stroke cycle each revolution, i.e. when there are no idle strokes. Theoretically, 2-stroke cycles are the most economical ones, and if that would be the case also in reality, the suction stroke of the 4-stroke cycle is only needed upon the start. The control system can be arranged in order to calculate if, and under what conditions 2-stroke cycle or 4-stroke cycle is the most economical one, and thereafter select the one to be performed with a certain frequency. Accordingly, the control method includes controlling the operating cycles of the engine to be 2-stroke or, if there are more than one cylinder, and/or 4-stroke based on these given conditions. A control system comprises a control unit that includes a computer program adapted for this purpose and provided on a data carrier. The control unit is operatively connected to a circuit for pneumatical, hydraulic, electromagnetic or other type of activation of at least the inlet valves, but in certain cases also the outlet valves. The control unit may, for example, be arranged to control magnet valves by electric signals, said magnet valves being arranged in the circuits for the activation of the inlet valves of the engine or the inlet and outlet valves of the engine. The control unit is operatively connected with the members for torque request, for example a gas pedal via which a driver gives an order regarding the requested increase or decrease of the torque of the engine. The control system for a frequency modulated torque may constitute a subsystem, for example an economy mode, in a larger control system that may also bring completely different properties to the engine in question.

There are great advantages of spark ignition engines by which the gas application today is regulated by means of a throttle. By throttle regulation the compression relationship is not optimal at any other occasions than at a high gas application. Throttle regulation results in throttle losses. A regulation by means of controllable inlet valves will also result in throttle losses, but they will be significantly smaller than by throttle regulation. The application of the present invention will result in non-existence of throttle losses caused by a throttle, and that throttle losses will be minimized upon use of controllable inlet valves. Diesel engines do not have any throttle regulation, and, therefore, the advantages of the invention are less in this case, but it is known that the utilizing of the fuel can be improved by an early closure of the inlet valves. The formation of relatively high contents of nitrogen oxide and soot are well known problems by diesel engine operation. The present invention also gives a possibility of varying the torque for diesel engines by, especially at idle operation and low loads, repeating an operating setting that result in a high efficiency while, at the same time, the generation of soot and nitrogen oxides is minimized, which is of significant advantage. The advantages of the invention in connection to diesel engine operation become more evident if the turbo aggregate is provided with variable geometry, so called VGT. Homogenous Combustion Compression Ignition, named HCCI, is a combustion cycle with high efficiency and other environmental advantages, but with a low effect density. The problem of HCCI arises when a varying demand of torque is to be met. There still has not been suggested any control method in which said advantages can be maintained upon varying load. However, the invention implies a control method for varying the load and maintaining the advantages of HCCI. However, the advantages of the invention will be greater if the HCCI-engine is equipped with exhaust gas recycling, so called EGR, which permits a substantially increased effect density. Accordingly, the present invention is of great value for the combustion cycle of HCCI.

When the invention is applied to a vehicle with a traditional driving line, the forward movement of the vehicle may be experienced as somewhat irregular at low speed. In order to avoid this, the control system may, for example, be arranged such that, when the speed or the number of revolutions per minute goes below a certain value, it controls the engine to change from optimum power strokes to semi optimal power strokes in order to increase or maintain the frequency of power strokes. However, this is not any problem when the gearbox or the transmission is in an idle position. A system with a hydraulic driving line would also result in the non existence of said problem. In such a driving line, an engine with the invention applied thereto may pump hydraulic oil to an energy storage, whereby an uneven operation at rotation speeds does not matter. The vehicle is driven under a regular tap off from the energy storage.

The lower load extraction, the greater saving of fuel and other environmental advantages are obtained with a frequency modulated torque. An engine and its control system may be designed in order to cover the whole operative range of the engine with different frequencies of optimal and semi optimal power strokes as the only control method. This would give the engine a very good fuel economy within its whole operation range.

The invention is not departed from by the selection of power strokes that are not optimal or by selecting a frequency that is not the best one.

Figure 1:
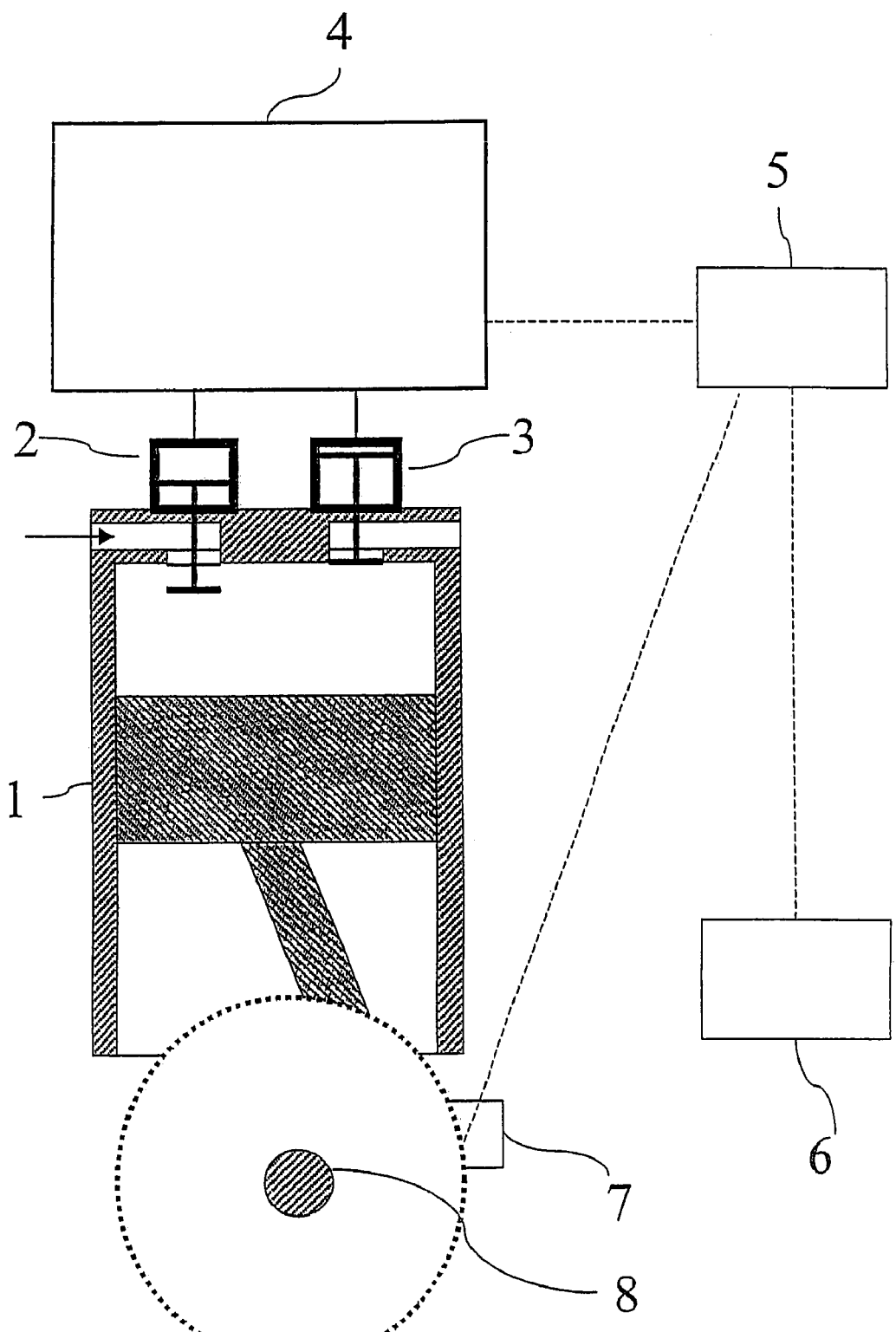
FIG. 1 is an exemplifying, schematic picture showing a cylinder with a piston 1. The piston is moving during a suction stroke in a 4-stroke cycle, and air is flowing together with fuel through the open inlet valve 2. The inlet valve 2 and the closed outlet valve 3 are constituted by controllable valves. A circuit 4 is used for activation of the valves. A control unit 5 is operatively connected to the circuit 4 for signal control of the circuit and the valves connected with the circuit. A member 6, for example a gas pedal, is operatively connected with the control unit 5 for torque ordering. A sensor 7, at a graduated ark that is mounted on the engine shaft 8 and operatively connected with the control unit 5, repeatedly gives information to the control unit about number of revolutions per minute and position of the piston in the cylinder 1. The control unit 5 decides when the controllable valves shall open or close, and, thereby, the frequency.

The invention claimed is:

1. A control method for modulating the torque in an internal combustion engine with mechanical power transmission and with pneumatically, hydraulically or electromagnetically activatable, controllable valves that are opened and closed based on signals from a control system, by which method the torque required in an operative situation at a certain moment is provided by a selection of the frequency with which power strokes are performed by controlling the number of power strokes in relation to the number of idle strokes, wherein, the power strokes take part in 2-stroke cycles and 4-stroke cycles, and wherein one or more 2-stroke cycles are alternated with one or more 4-stroke cycles, said idle strokes being performed without any introduction of air into the combustion chamber after the nearast foregoing power stroke.

2. A control method according to claim 1, characterized in that the engine comprises a plurality of cylinders, and that the power stroke frequency is chosen such that it is different for different cylinders.

3. A control method according to claim 1, characterized in that the power strokes are optimal.

4. A control method according to claim 1, characterized in that, at each power stroke, at a certain rotation speed of the engine, generally the same masses of air and fuel, and generally the same mixture of air and fuel is ignited as in the other power strokes.

5. A control method according to claim 1, characterized in that the composition of the different chemical compounds of the exhaust gases remain generally the same.

6. A control method according to claim 1, characterized in that the power stroke frequency at a given rotation speed of the engine is decisive for the torque.

7. A control method according to claim 1, characterized in that it comprises the use of a computer program that, by means of signal control, based on a torque requested by a driver, chooses the frequency of power strokes.

8. A control method for modulating the torque in an internal combustion engine with mechanical power transmission and controllable valves opened and closed based on signals from a control system, comprising the steps of:
   providing torque required in an operative situation by selecting a frequency with which power strokes are performed, the selection by controlling a number of power strokes in relation to a number of idle strokes,
   the power strokes taking part in 2-stroke cycles and 4-stroke cycles, and
   one or more 2-stroke cycles are alternated with one or more 4-stroke cycles,
   the idle strokes being performed free of any introduction of air into the combustion chamber after the latest foregoing power stroke.

9. A control method for modulating the torque in an internal combustion engine with mechanical power transmission and controllable valves opened and closed based on signals from a control system, comprising the steps of:
   providing torque required in an operative situation by selecting a frequency with which power strokes are performed, the selection by controlling a number of power strokes in relation to a number of idle strokes,
   the power strokes taking part in 2-stroke cycles or in 4-stroke cycles, and
   one or more 2-stroke cycles are alternated with one or more 4-stroke cycles,
   the idle strokes being performed free of any introduction of air into the combustion chamber after the latest foregoing power stroke.

* * * * *